Inventor
Willard S. Campbell.
by James R. McKnight
Attorney

Patented Aug. 18, 1942

2,293,192

UNITED STATES PATENT OFFICE 2,293,192

TURNING DEVICE FOR MILK CANS AND OTHER ARTICLES

Willard S. Campbell, Hampshire, Ill., assignor, by mesne assignments, to Cherry-Burrell Corporation, Chicago, Ill., a corporation of Delaware Application August 19, 1940, Serial No. 353,239

7 Claims. (Cl. 214—1)

My invention relates to a construction for turning milk cans or other articles.

After milk cans have been washed and sterilized they are ordinarily in inverted position. It has been customary heretofore to provide means for turning the cans to upright position by causing them to tilt so that they fall by gravity into a turning cradle. After the cradle has turned sufficiently, the cans are discharged from the cradle, resting on one or more of their edges, and depend on the force of gravity to bring them to upright position. Such rough treatment damages the cans, often resulting in broken seams and battered cans. There is also considerable noise from the gravity falls. It is among the objects of this invention to solve these problems and to provide a construction which will eliminate the gravity falls in the turning of the cans. My invention provides means whereby the milk cans may be received in inverted vertical position, held during the half-turn and released in upright vertical position. The turning of the cans is completely controlled by the can turning or inverting mechanism and does not depend upon the can falling by gravity to complete the half-turn desired. The improved construction is gentle, quiet and safe in operation, and contemplates such other objects, advantages and capabilities as will later more fully appear and which are inherently possessed by my invention.

While I have shown in the accompanying drawings a preferred form of my invention, yet I desire it understood that the same is susceptible of modification and change without departing from the spirit of my invention.

Figure 1:
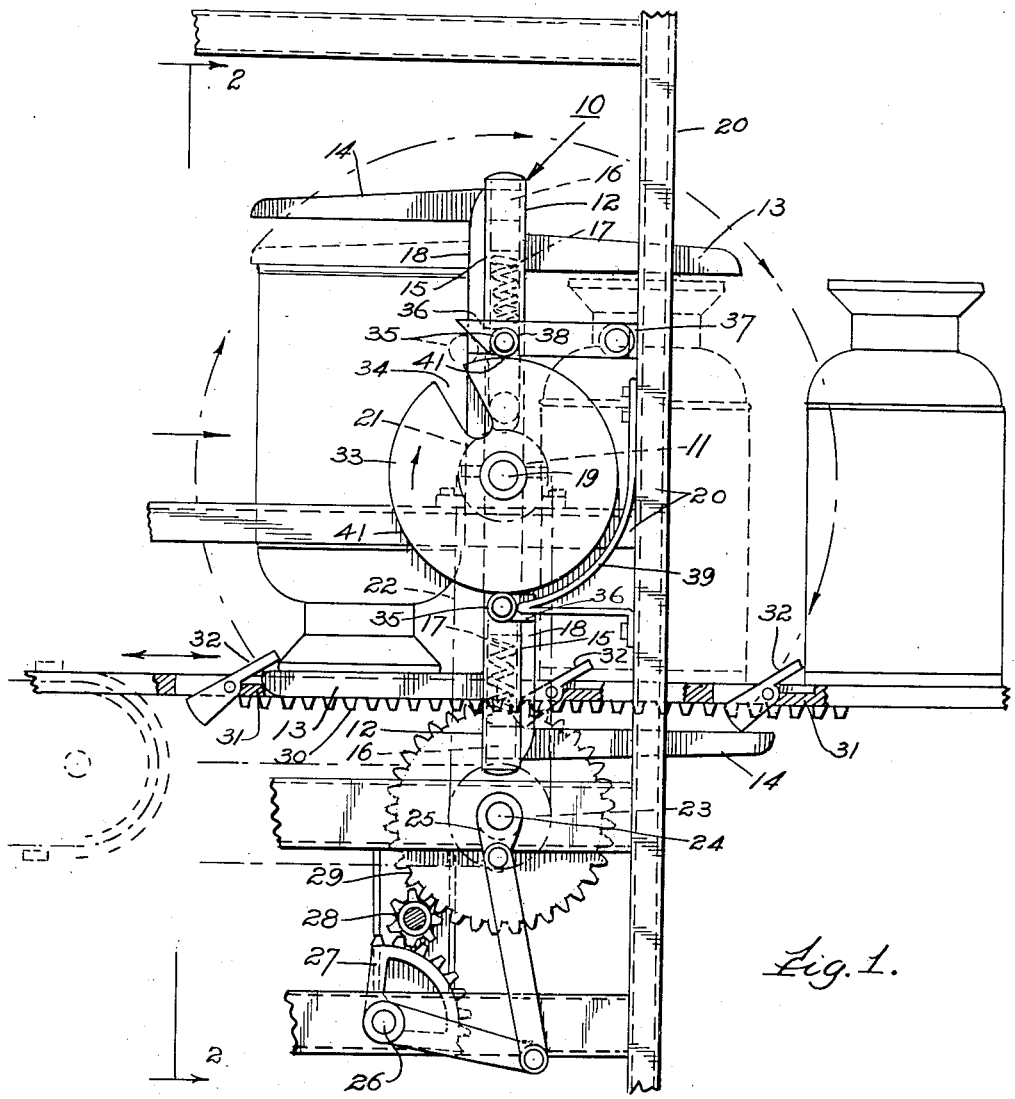
Figure 2:
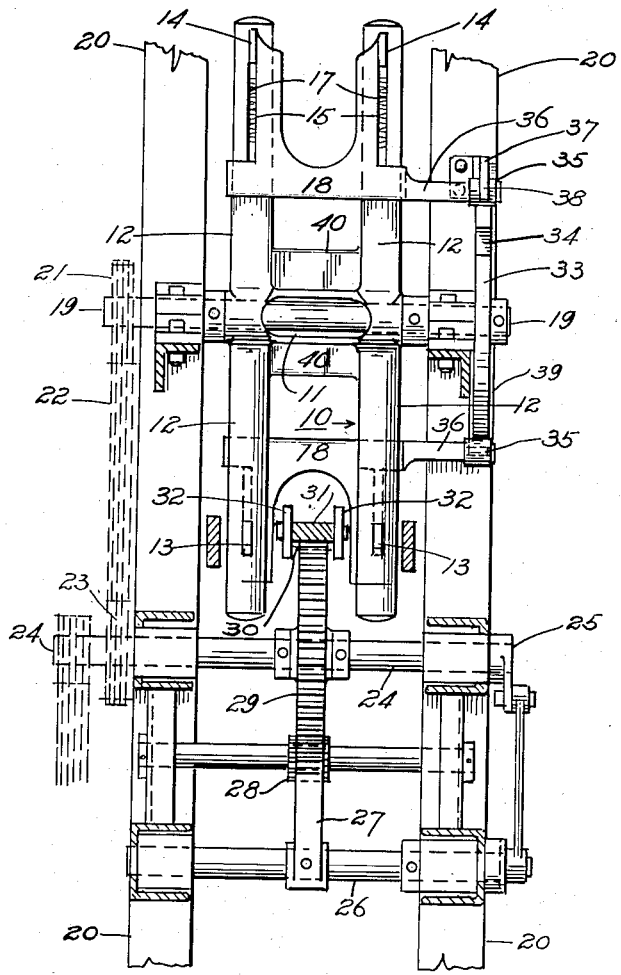

Referring to the drawings, Fig. 1 is a side elevation of a preferred embodiment of my invention; Fig. 2 is a sectional elevational view taken along line 2—2 of Fig. 1.

The embodiment selected to illustrate my invention comprises a body member 10 having a substantially centrally located transverse portion 11. Extending vertically from both sides of said transverse portion are pairs of spaced vertical extensions 12. Adjacent the outer ends of vertical extensions 12 and extending horizontally therefrom on one side are fixed arms 13 and on the other side movable arms 14. Webs 40 extend between opposite extensions 12 to provide rigidity. The extensions 12 have a slot 15 within which slides the inner portion 16 of a movable arm 14. A spring 17 is positioned within said slot 15 to ease the fall thereagainst of the portion 16 of movable arm 14. A connecting web 18 is provided between adjacent movable arms 14.

A shaft 19 is turnable within transverse portion 11 of body member 10 and is rotatably attached to frame 20. The shaft 19 is turned by an upper wheel 21 driven by a chain 22, the lower portion of which is driven by lower wheel 23 which is moved by a power shaft 24 powered by a steam turbine, electric motor or other suitable source of power.

The power shaft 24 has at its outer end an eccentric crank 25 which partially rotates a lower shaft 26 which provides oscillating movement thereto and drives a gear segment 27 which in turn drives a small pinion 28 which engages and moves a large pinion 29. The large pinion 29 engages the teeth 30 in the under portion of the rack 31 and moves the rack back and forth.

The rack 31 has on its upper portion a plurality of spaced sets of counterweighted dogs 32 pivotally attached thereto. The rack 31 in operation moves forward to contact a milk can or other article conveyed thereto by a chain drive or other means. Upon the can moving onto the rack 31 the dogs 32 engage the can and hold it on the rack as the rack moves the can forward in an inverted vertical position until the can is placed over the waiting fixed arms 13 of the body member 10 of the can inverter.

Attached adjacent the opposite end of shaft 19 is a cam 33 provided with a slot 34 for the purpose of receiving cam followers 35 which are attached to connecting members 36. The connecting members 36 are extensions of webs 18 which extend between adjacent movable arms 14 of the body member 10.

A bracket 37 is pivotally attached to frame 20 and has a hook or lock portion 38 adjacent its inner lower portion adapted to engage a cam follower 35. The lock portion 38 holds the cam follower 35 as it idles on the face 41 of the cam 33 until the cam follower 35 moves into slot 34 of the cam 33. When the follower 35 drops into slot 34, latch 37 is clear of the surface 41 of the cam 33 due to its attachment to the frame 20 above the cam 33 by a conventional type of pivot or hinge which permits the latch 37 to come to rest in a substantially horizontal position immediately above and in the plane of the cam wheel 33.

A curved guide 39 is attached to the frame 20 and curves downwardly along the contour of the cam 33 and acts as a guide to retain the cam follower 35 in the slot 34 during a portion of the half-revolution of the cam.

In the operation of my device, the feeding means 31 and 32 is shown in Fig. 1 as having moved forwardly to deposit a milk can in inverted position on the fixed arms 13. The can is shown in its first position in solid lines at the left in Fig. 1. The feeding means 31 and 32 is timed to deposit the milk can or the like in this position on fixed arms 13 when the cam 33 is in the position shown in Fig. 1 with the slot 34 approaching upper vertical position. When the slot reaches upper vertical position an instant later the cam follower 35 drops into slot 34 permitting movable arms 14 to fall against and contact the inverted bottom of the milk can. The movable arms 14 remain against the bottom of the milk can during the half-revolution until the cam follower 34 passes the lower end of guide 39 and falls out of slot 34 which is then in lower vertical position.

When the cam follower 35 falls out of slot 34, gravity causes the movable arms 14 with the can on top of them to drop the extensions 16 of movable arms 14 within slots 15. The milk can is then released on rack 31 as shown at the right in Fig. 1 in dotted lines.

In the operation of the improved can inverter, cans in an inverted position are supplied to the inverter by the can supply conveyor comprising rack 31, the motion of which is synchronized with the motion of the can inverter. The cans supplied by the rack 31 are deposited in the can inverter when said inverter is in the loading position or at the loading station.

Shortly after an inverted can has been deposited in the can inverter at the loading station the cam follower 35, which is actuated by the movable can gripping body 14, engages the slot 34 of the cam wheel 33 by descending thereinto when said slot 34 becomes alined with the cam follower 35 whereupon the can inverter, consisting primarily of the body element 10 and the associated can engaging jaws 13 and 14, is rotated until the cam follower 35 becomes disengaged from the walls of the slot 34 of the cam wheel 33. Such disengagement takes place after the inverter has been rotated through approximately 180 degrees. At that time the cam follower 35 becomes disengaged from the cam wheel 33, permitting the can inverting cradle or body to remain stationary so that the inverted can may be removed by the reciprocating rack 31 while the cam 33, powered by the continuously rotating shaft 19, continues to rotate.

Having thus described my invention, I claim:

1. A device of the class described comprising a frame, a shaft rotatably mounted on said frame, a body member attached to and rotated by said shaft, said body member having fixed arms and movable arms, a feeding means adapted to receive an object thereon and move it onto waiting fixed arms, a rotatable cam attached to said shaft, cam followers attached to said movable arms, a latch attached to said frame to receive and temporarily hold a cam follower as it idles on the face of said cam, said cam having a slot positioned to receive a cam follower just after the feeding means has placed the object on the waiting fixed arms so as to permit the movable arms to fall and grip the object, and a curved guide attached to said frame and extending adjacent said cam to hold the cam follower in the slot and prevent premature release of the movable arms and dropping of the object.

2. A construction for turning an inverted article to upright position comprising a frame, a shaft rotatably mounted on said frame, a body member attached to and rotated by said shaft, said body member having fixed arms and movable arms, feeding means positioned below said body member and adapted to place an inverted article onto waiting fixed arms of the body member, a cam attached to and rotated by said shaft, cam followers attached to said movable arms, a latch pivotally attached to said frame and adapted to receive and temporarily hold a cam follower as it idles on the face of the cam, said cam having a slot positioned to receive a cam follower just after the feeding means has placed an inverted article on the waiting fixed arms so as to permit the movable arms above the inverted article to fall against the bottom of the inverted article, said movable arms remaining against the bottom of the inverted article by means of gravity during substantially the half-revolution of the body member, and a curved guide attached to said frame and extending adjacent the lower portion of the cam to cooperate in preventing the cam follower from leaving the slot in the cam until the half-revolution has been substantially completed and the article is about to be released on the feeding means in upright vertical position.

3. A construction for turning an inverted article to upright position comprising a frame, a shaft rotatably mounted on said frame, a body member attached to and rotated by said shaft, fixed arms attached adjacent one end of the body member, movable arms slidably attached adjacent the opposite end of the body member, said fixed and movable arms being spaced above and below each other and extending at right angles to said body member in the same direction, other fixed arms attached to the body member adjacent an end thereof and on the opposite side from that to which the first mentioned fixed arms are attached, other movable arms slidably attached to the body member adjacent an end thereof and on the opposite side from that to which the first mentioned movable arms are attached, said second mentioned fixed and movable arms being spaced above and below each other and extending at right angles to the body member in a direction opposite to that of the first mentioned fixed and movable members, feeding means positioned below said body member and adapted to place an inverted article onto waiting fixed arms of the body member, a cam attached to and rotated by said shaft, cam followers attached to said movable arms, a latch pivotally attached to said frame and adapted to receive and temporarily hold a cam follower as it idles on the face of the cam, said cam having a slot positioned to receive a cam follower just after the feeding means has placed an inverted article on the waiting fixed arms so as to permit the movable arms above the inverted article to fall against the bottom of the inverted article, said movable arms remaining against the bottom of the inverted article by means of gravity during substantially the half-revolution of the body member, and a curved guide attached to said frame and extending adjacent the lower portion of the cam to cooperate in preventing the cam follower from leaving the slot in the cam until the half-revolution has been substantially completed and the article is about to be released on the feeding means in upright vertical position.

4. An object inverting device comprising, in combination, a support, a rotatable body member for inverting objects, said body member being mounted on said support and being rotatable through a cycle of loading and unloading stations, an object gripping member carried by said body member, said object gripping member being gravitationally movable to and from object gripping position, and means for rotating said body member controllable by the gravitational movement of said object gripping member upon movement of said object gripping member into object gripping position.

5. An object inverting device comprising, in combination, a rotatable body member for inverting objects, said body member being mounted on said support and being rotatable through a cycle of loading and unloading stations, a plurality of object gripping members carried by said body member, said object gripping members being gravitationally movable to and from object gripping position, and means for rotating said body member controllable by the gravitational movement of an object gripping member upon movement of said gripping member into object gripping position.

6. An object inverting device comprising, in combination, a support, a rotatable body member for inverting objects, said body member being mounted on said support and being rotatable through a cycle of loading and unloading stations, an object gripping member carried by said body member, said object gripping member being gravitationally movable to and from object gripping position, means for rotating said body member controllable by the gravitational movement of said object gripping member upon movement of said object gripping member into object gripping position, and means synchronized with the rotation of said body member for moving inverted objects into the loading station of said body member and for moving said objects when righted from the unloading station of said body member.

7. In a device of the class described having object advancing means, an object inverter having loading and unloading stations for inverting said objects and depositing them upon said advancing means in up-ended position, said inverter having opposed object gripping means, one of said object gripping means being gravitationally movable, and means for motivating said inverter from the loading station to the unloading station, said motivation of said inverter being controlled by the gravitational movement of said movable gripping means for commencing said motivation of said inverter when at said loading station and for terminating said motivation of said inverter when at said unloading station.

WILLARD S. CAMPBELL.

CERTIFICATE OF CORRECTION.

Patent No. 2,293,192.　　　　　　　　　　　　　　August 18, 1942.

WILLARD S. CAMPBELL.

It is hereby certified that error appears in the printed specification of the above numbered patent requiring correction as follows: Page 3, first column, line 2, claim 4, strike out "body member, said object gripping member being"; and that the said Letters Patent should be read with this correction therein that the same may conform to the record of the case in the Patent Office.

Signed and sealed this 13th day of October, A. D. 1942.

(Seal)　　　　　　　　　　　　　　　　　　Henry Van Arsdale,
　　　　　　　　　　　　　　　　　　　Acting Commissioner of Patents.